US007904952B2

(12) United States Patent
Yeap et al.

(10) Patent No.: US 7,904,952 B2
(45) Date of Patent: Mar. 8, 2011

(54) SYSTEM AND METHOD FOR ACCESS CONTROL

(75) Inventors: Tet Hin Yeap, Ottawa (CA); Dafu Lou, Ottawa (CA); William G. O'Brien, Orleans (CA)

(73) Assignee: BCE Inc., Verdun, Quebec (CA)

( * ) Notice: Subject to any disclaimer, the term of this patent is extended or adjusted under 35 U.S.C. 154(b) by 1117 days.

(21) Appl. No.: 11/002,315

(22) Filed: Dec. 3, 2004

(65) Prior Publication Data

US 2006/0080534 A1    Apr. 13, 2006

Related U.S. Application Data

(63) Continuation of application No. PCT/CA2004/001821, filed on Oct. 12, 2004.

(51) Int. Cl.
*G06F 21/20* (2006.01)
*H04L 9/00* (2006.01)
(52) U.S. Cl. ............. 726/12; 713/156; 713/158; 726/10
(58) Field of Classification Search .................... 726/12, 726/1–5, 17, 19, 27, 28, 29; 713/155, 156, 713/158, 171, 176, 185
See application file for complete search history.

(56) References Cited

U.S. PATENT DOCUMENTS

| 5,757,924 | A |  | 5/1998 | Friedman et al. |
| 6,088,805 | A |  | 7/2000 | Davis et al. |
| 6,393,484 | B1 |  | 5/2002 | Massarani |
| 6,484,258 | B1 |  | 11/2002 | Haverty |
| 6,636,975 | B1 | * | 10/2003 | Khidekel et al. ................. 726/10 |
| 6,772,331 | B1 |  | 8/2004 | Hind et al. |
| 6,772,340 | B1 |  | 8/2004 | Peinado et al. |
| 6,826,690 | B1 | * | 11/2004 | Hind et al. ..................... 713/186 |
| 6,854,056 | B1 | * | 2/2005 | Benantar et al. .............. 713/156 |

(Continued)

FOREIGN PATENT DOCUMENTS

GB    2 359 969 A    9/2001

(Continued)

OTHER PUBLICATIONS

Office Action issued by the Canadian Intellectual Property Office on Mar. 10, 2010 in connection with Canadian Patent Application No. 2,578,186, 3 pages.

*Primary Examiner* — Jung Kim
*Assistant Examiner* — Izunna Okeke

(57) ABSTRACT

A system and method for access control is provided. In one embodiment, a system includes a computing device connected to an access server that controls the ability of the computing device to access to a computing resource, such as the Internet. The access server connects to an activation server via a network. The activation server is operable to receive a request for to generate a certificate for the computing device from the activation server. The activation server is operable to generate the certificate and embed a unique identifier of the computing device and/or the access server and/or the like inside the certificate. Once generated, the certificate is installed in the computing device. When the computing device initiates a request to access the computing resource, the computing device initially sends the certificate to the access server. If the certificate received by the access server does not include the expected unique identifier(s), then access to the computing resource is prevented and/or restricted. If the key received by the access server includes the expected unique identifier(s), then access to the computing resource is permitted.

74 Claims, 13 Drawing Sheets

U.S. PATENT DOCUMENTS

| | | | |
|---|---|---|---|
| 7,042,988 B2 * | 5/2006 | Juitt et al. | 379/88.17 |
| 7,313,702 B2 * | 12/2007 | Shimada et al. | 713/184 |
| 2002/0056050 A1 * | 5/2002 | Heiden et al. | 713/201 |
| 2002/0136226 A1 * | 9/2002 | Christoffel et al. | 370/401 |
| 2002/0196764 A1 | 12/2002 | Shimizu | |
| 2003/0177350 A1 | 9/2003 | Lee | |
| 2003/0185395 A1 * | 10/2003 | Lee et al. | 380/277 |
| 2003/0217263 A1 | 11/2003 | Sakai | |
| 2003/0233580 A1 * | 12/2003 | Keeler et al. | 713/201 |
| 2004/0030887 A1 * | 2/2004 | Harrisville-Wolff et al. | 713/155 |
| 2004/0243804 A1 * | 12/2004 | Tajima | 713/175 |
| 2006/0005237 A1 * | 1/2006 | Kobata et al. | 726/12 |

FOREIGN PATENT DOCUMENTS

| | | |
|---|---|---|
| JP | 11000692 | 7/2000 |
| JP | 2000201143 A | 7/2000 |
| JP | 2000136224 | 11/2001 |
| JP | 2001320373 A | 11/2001 |
| WO | WO 03/096719 A1 | 11/2003 |

* cited by examiner

SYSTEM AND METHOD FOR ACCESS CONTROL

PRIORITY CLAIM

The present application is a continuation application claiming priority from PCT Patent Application No. PCT/CA2004/001821 filed Oct. 12, 2004, the contents of which are incorporated herein by reference.

FIELD OF THE INVENTION

The present invention relates generally to computer security and and more particularly to a system and method for access control.

BACKGROUND OF THE INVENTION

The growing reliance on computers for enterprise transactions brings with it increased need to ensure proper security. The growth in wireless networks further increases this need, in order to reduce the likelihood of eavesdroppers stealing Internet access and/or gaining access to restricted computing resources.

One particular environment where these issues arise is in business establishments frequented by customers, such as retail environments or restaurants. When such establishments use wireless computing devices to conduct transactions with customers, the establishments are faced with an increased security risk as eavesdroppers attempt to gain access to the wireless network.

This problem is exacerbated where there are a chain of retail outlets belonging to a single enterprise, and where each of those outlets use substantially the same wireless network configuration. A wirelessly enabled laptop or other computing device stolen from one outlet may be taken outside the premises of another outlet, potentially allowing unauthorized access to the computing resources belonging to the entire enterprise. A prior art way of addressing this problem is to simply revoke the security access rights for any stolen computing device at the wireless access points belonging to the enterprise. However, where an enterprise has hundreds of outlets, the process of revoking the security rights for each and every access point at each and every outlet can prove daunting and/or administratively impossible.

SUMMARY OF THE INVENTION

It is an object of the present invention to provide a novel system and method for access control that obviates or mitigates at least one of the above-identified disadvantages of the prior art.

An aspect of the invention provides in a gateway server, a method of controlling access to a resource comprising:
  receiving a digital certificate from a device;
  extracting an identifier embedded into the certificate;
  determining if the identifier is valid;
  if the identifier is determined to be valid, permitting the device to access the resource; and,
  if the identifier is determined to be invalid, denying the device access to the resource.

The method can additionally comprise, if the identifier is determined to be invalid, revoking the digital certificate.

The method can comprise the additional step of determining whether the certificate has been revoked, and, if the certificate has been revoked, denying the device access to the resource.

The identifier can be a gateway identifier associated with the gateway server and the determining step involves comparing the extracted identifier with a local store of the identifier.

The identifier can be selected from the group consisting of a serial number associated with a central processing unit of the gateway server; a hard drive identifier associated with a hard drive local to the gateway server; a unique name of the server assigned to an operating system executing on the server; a name associated with a set of gateway servers.

The identifier can be a device identifier unique to the device.

The identifier can be selected from the group consisting of a serial number associated with a central processing unit of the device; a hard drive identifier associated with a hard drive local to the device; a unique name of the device assigned to an operating system executing on the device.

The certificate can include a device public encryption key associated with the device and the identifier is a digital signature generated by signing the device public encryption key with a gateway server public encryption key associated with the server, and wherein the determining step comprises determining a validity of the digital signature using a gateway server private encryption key, the identifier being invalid if the digital signature cannot be verified using the gateway server private encryption key.

The identifier can be at least one of: a) a gateway identifier associated with the gateway server; b) a device identifier unique to the device; and c) a digital signature generated by signing a device public encryption key embedded in the certificate.

The resource can be selected from the group consisting of at least one of the Internet and a local area network.

Another aspect of the invention provides a gateway server comprising a first interface for connection to a local device and a second interface for connection to a resource. The server further comprises a microcomputer intermediate the interfaces. The microcomputer is operable to receive a request for access to the resources from the device. The request includes a certificate received from the device. The microcomputer is operable to extract an identifier embedded into the certificate and further operable to permit the device to access the resource if the identifier is valid. The microcomputer is also operable to deny the device access to the resource if the identifier is invalid.

The microcomputer can be further operable to revoke the certificate if the identifier is invalid.

The microcomputer can be further operable to determine whether the certificate has been revoked using a certificate revocation list and, if the certificate has been revoked, then further operable to deny the device access to the resource.

The identifier can be a gateway identifier that is associated with the gateway server. The identifier can be selected from the group consisting of a serial number associated with a central processing unit of the gateway server; a hard drive identifier associated with a hard drive local to the gateway server; a unique name of the server assigned to an operating system executing on the server; a name associated with a set of gateway servers.

The identifier can be a device identifier unique to the device. The identifier can be selected from the group consisting of a serial number associated with a central processing unit of the device; a hard drive identifier associated with a hard drive local to the device; a unique name of the server assigned to an operating system executing on the device.

The certificate can include a device public encryption key associated with the device and the identifier is a digital signature generated by signing the device public encryption key with a gateway server public encryption key associated with the server, and wherein the microcomputer is operable to determine a validity of the digital signature using a gateway server private encryption key, the identifier being invalid if the digital signature cannot be verified using the gateway server private encryption key.

The identifier can be at least one of: a) a gateway identifier associated with the gateway server; b) a device identifier unique to the device; and c) a digital signature generated by signing a device public encryption key embedded in the certificate.

The resource can be selected from the group consisting of at least one of the Internet and a local area network.

Another aspect of the invention provides a digital certificate for use on a client device, the digital certificate including an identifier embedded therein. The identifier is extractable by a server to which the device can connect such that the server can permit or deny access to a resource connected to the server based on a validity of the identifier.

Another aspect of the invention provides a method of generating a digital certificate for use on a client device comprising:
  receiving at least one unique identifier;
  generating a digital certificate payload;
  embedding the at least one unique identifier and the payload into a certificate.

Another aspect of the invention provides a computer readable media containing a set of programming instructions for use in a gateway server, the instructions including a method of controlling access to a resource comprising:
  receiving a digital certificate from a device;
  extracting an identifier embedded into the certificate;
  determining if the identifier is valid;
  if the identifier is determined to be valid, permitting the device to access the resource; and,
  if the identifier is determined to be invalid, denying the device access to the resource.

BRIEF DESCRIPTION OF THE DRAWINGS

The invention will now be described by way of example only, and with reference to the accompanying drawings, in which.

DETAILED DESCRIPTION OF THE INVENTION

Figure 1:
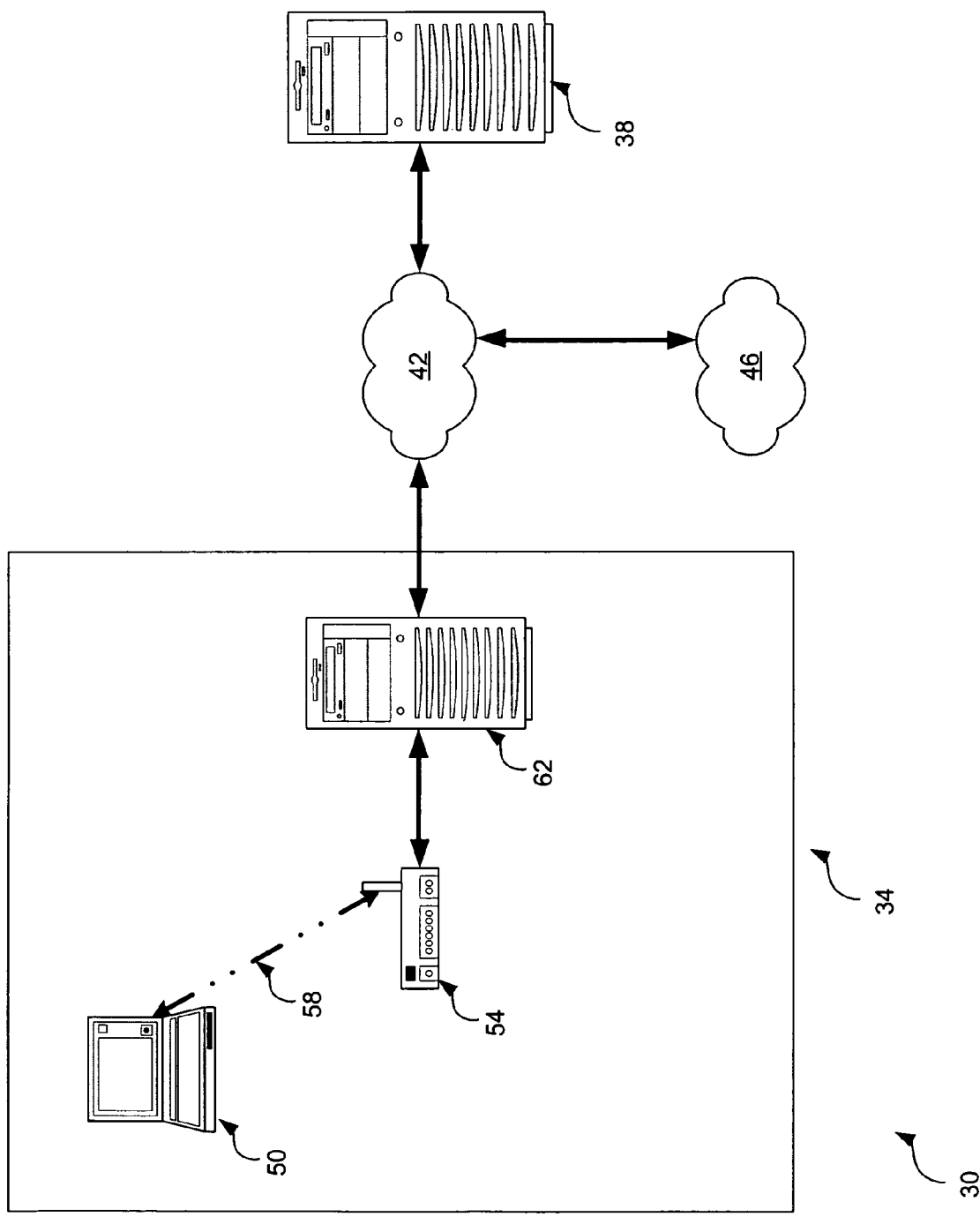
FIG. 1 is a schematic representation of a system for access control in accordance with an embodiment of the invention.

Referring now to FIG. 1, a system for access control is indicated generally at 30. System 30 includes a local network 34 that connects to a security activation server 38 via a private network 42. Local network 34 also connects to the Internet 46 via private network 42. As will be explained in greater detail below, computing devices within local network 34 can access Internet 46 once certain steps have been taken using activation server 38. It is to be understood that Internet 46 is also merely exemplary, and that Internet 46 could be any type of computing resource that is to be accessed by computing devices within local network 34.

Local network 34 thus includes a client computing device 50 that connects to a wireless access point 54 via a wireless link 58. Link 58 is based on a protocol such as 802.11 g or its variants, or any other protocol that may be desired. In turn, access point 54 connects to a secure access server 62. Accordingly, wireless access point 54 is based on any appropriate hardware architecture that provides a conduit between link 58 and server 62.

Activation server 38 is based on any desired standard computing environment. Server 38 can be, for example, an Intel® Pentium-based computer executing a Microsoft(R) Windows NT (or its variants) operating system, and having at least one central processing unit and having about two gigabytes of random access memory. Server 38 also includes appropriate interfaces to allow server 38 to communicate with network 42. However, it is to be emphasized that this particular server is merely exemplary, a vast array of other types of computing environments for server 38 are within the scope of the invention.

Computing device 50, in a present embodiment, is a laptop computer having a keyboard and mouse (or other input devices), a monitor (or other output device) and a chassis connecting the keyboard, mouse and monitor and housing one or more central processing units, volatile memory (i.e. random access memory), non-volatile memory (i.e. hard disk devices) and network interfaces to allow the device 50 to communicate over link 58. However, it is to be understood that device 50 can be any type of computing device, such as a personal computer, personal digital assistant, cell phone, laptop computer, email paging device etc. Device 50 is operated by a user that wishes to access Internet 46.

Server 62 is also based on any standard type of computing environment that is operable to facilitate communications between device 50 and Internet 46. Server 62 can be, for example, an Intel® Pentium-based computer executing a Microsoft® Windows NT (or its variants) operating system, and having at least one central processing unit and having about two gigabytes of random access memory. Server 62 also includes appropriate interfaces to allow server 62 to communicate with access point 54. However, it is to be emphasized that this particular server is merely exemplary, a vast array of other types of computing environments for server 62 are within the scope of the invention.

Figure 2:
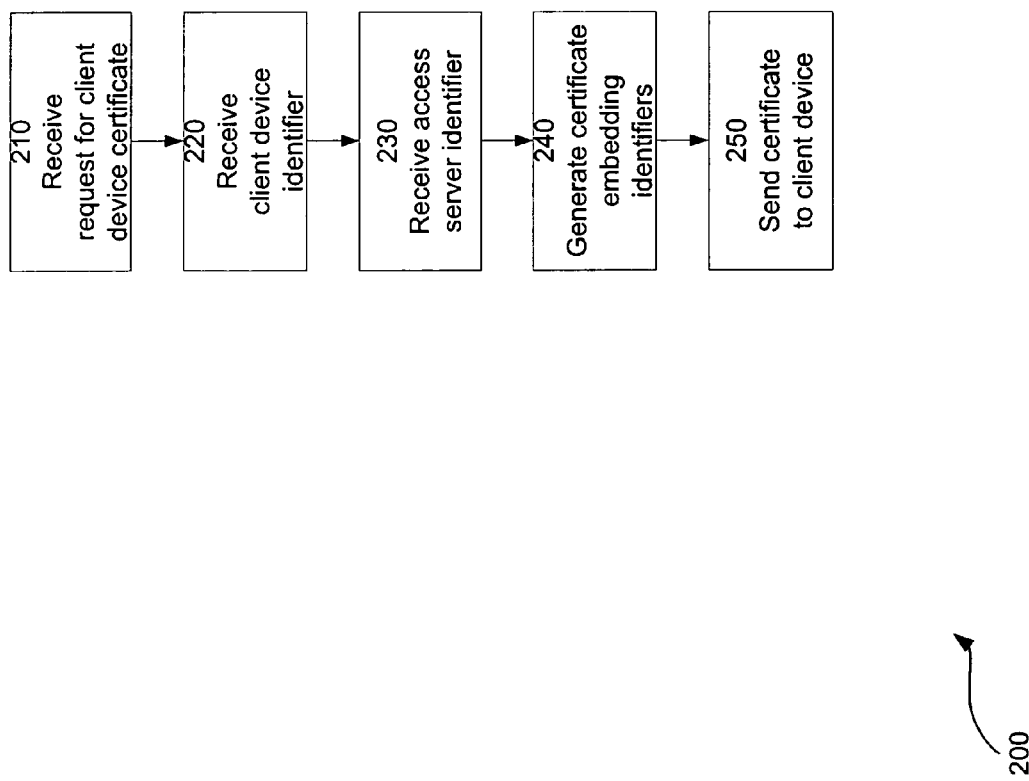
FIG. 2 shows a flow-chart depicting a method for access control in accordance with another embodiment of the invention.

Reference will now be made to FIG. 2 which shows flowchart depicting a method for access control which is indicated generally at 200. In order to assist in the explanation of the method, it will be assumed that method 200 is performed using 30. However, it is to be understood that system 30 and/or method 200 can be varied, and need not work exactly as discussed herein in conjunction with each other, and that such variations are within the scope of the present invention.

Beginning first at step 210, a request is received for a client device certificate. When implemented on system 30, this request relates to a request for encryption certificate for computing device 50. In a present embodiment, this request is made in the form of an email that is prepared by a system administrator (or other user) operating server 62. The email includes the request for a client device certificate, and the email is sent to server 38 via network 42. As will be explained in greater detail below, the email also includes a client device identifier and an access server identifier. All information sent inside the email is known to server 38 and stored for future use by server 38. Having sent the email, this email request is then received at server 38.

Next, at step 220 a client device identifier is received. This step is performed by server 38, which examines the email request received at step 210. Embedded within the email request is an identifier that is unique to device 50. Thus, server 38 will receive the client device identifier by extracting it from the email received at step 210. The way in which the unique identifier for device 50 is created or assigned is not particularly limited. For example, the unique identifier may be a serial number associated with the central processing unit of device 50, or a media access control ("MAC") address of a network interface in device 50, or a smart card for use in a smart card reader associated with device 50, or the name of device 50, or the like. Other ways of creating or assigning a unique identifier to device 50 will now occur to those of skill in the art.

Next, at step 230 an access server identifier is received. This step is also performed by server 38, which further examines the email request received at step 210. Also, embedded within the email request is an identifier that is unique to or otherwise associated with access server 62. Thus, server 38 will receive the access server identifier by extracting it from the email received at step 210. The way in which the unique identifier for access server 62 is created or assigned is not particularly limited. For example, the unique identifier may be a serial number associated with the central processing unit of access server 62, or a media access control ("MAC") address of a network interface in server 62, or a smart card for use in a smart card reader associated with server 62, or the name of server 62, or a set of servers collectively forming the function of server 62, or the like. Other ways of creating or assigning a unique identifier to device 50 will now occur to those of skill in the art.

Next, at step 240, a certificate is generated that embeds the identifiers from steps 220 and 230. Thus, server 38 will generate an encryption certificate for device 50 in substantially the usual manner, however, as part of that encryption certificate, server 38 will embed both the client device identifier from step 220, and the access server identifier from step 230.

Method 200 then advances to step 250, at which point the certificate generated at step 250 is delivered to, and installed upon device 50. This certificate can be returned from server 38 to device 50 in any usual manner, such as via an email where the certificate is attached thereto.

Of note, regardless of how the request from step 210 is delivered to server 38, and how the certificate is returned to device 50, it is to be understood that steps 210 and 250, in and of themselves, will involve appropriate or otherwise desired levels of security measures associated therewith to help reduce likelihood of security breach.

Figure 3:
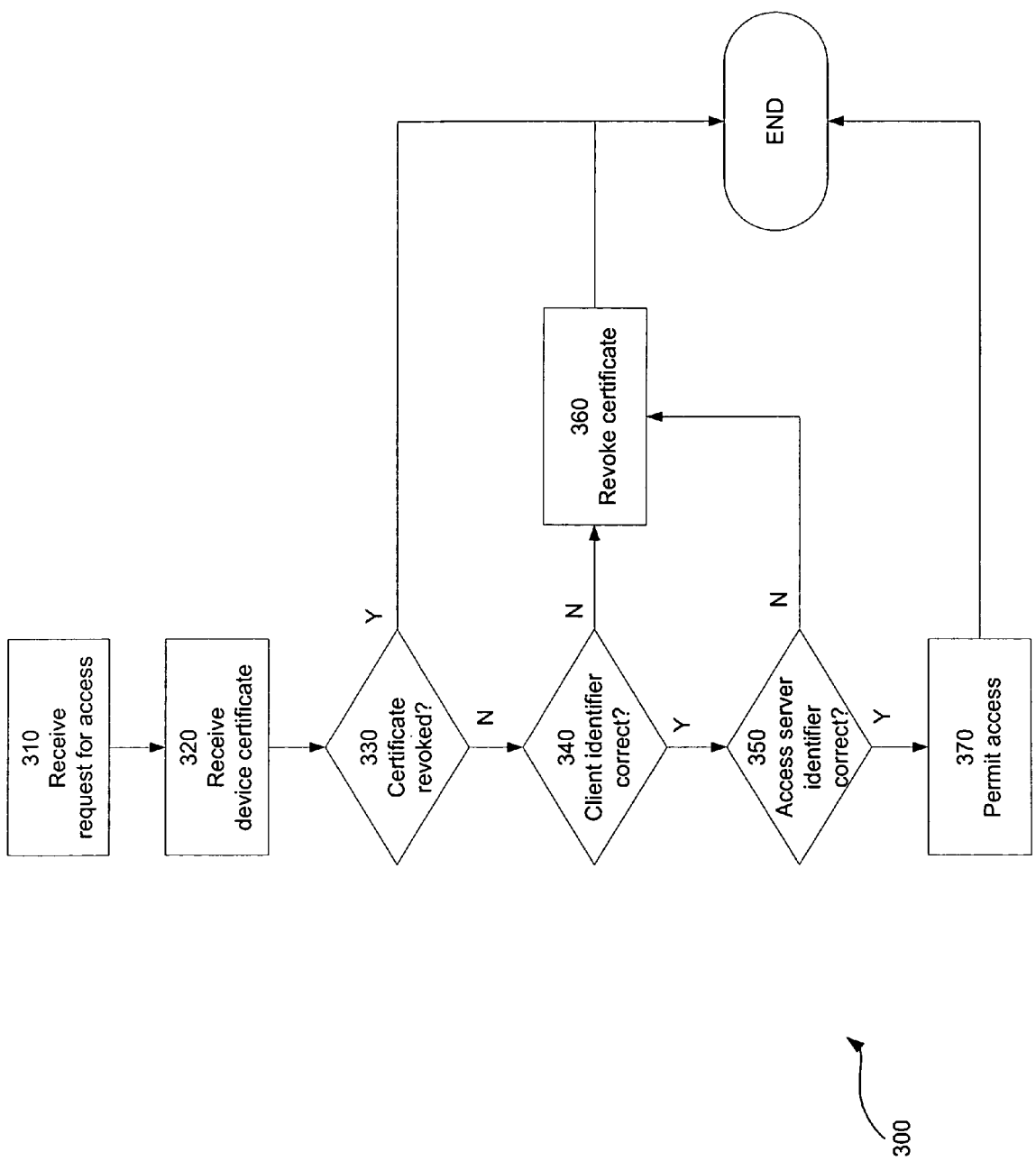
FIG. 3 shows a flow-chart depicting a method of controlling access in accordance with another embodiment of the invention.

Reference will now be made to FIG. 3 which shows flowchart depicting a method of controlling access which is indicated generally at 300. Before performing method 300, it is assumed that method 200 has been performed and that a client certificate has been installed on device 50, and that the information in the original request for the client device certificate is known to server 62.

Beginning first at step 310, a request for access is received. When implemented on system 30, this step is performed as device 50 sends a request to server 62 for access to Internet 46. Such a request is sent via link 58 and access point 54. Such a request can be transmitted as part of a login or other authentication procedure utilized by device 50. In this manner, server 62 receives a request for access.

Next, at step 320, a device certificate is received. When implemented on system 30, this step is performed as device 50 sends a copy of the encryption certificate generated using method 200 and stored on device 50. In a present embodiment, the encryption certificate is sent from device 50 to server 62. Once the certificate is received by server 62 its contents are opened and examined.

It is to be reiterated that the manner in which the certificate is sent from device 50 is not particularly limited, but it is generally desired that the certificate be sent in a substantially secure manner, and that the contents of the certificate is recoverable however, by server 62 once server 62 receives the certificate. For example, in a presently preferred embodiment the certificate generated at step 200 can actually be implemented as a private key and public key pair, with the private key remaining resident on device 50, and with the public key being sent to server 62 at step 320 as part of the certificate. "Handshaking" messages can then be exchanged between server 62 and device 50 to provide encrypted communications are occurring over link 58 using the public and private key pair.

However the certificate is implemented, next at step 330 a determination is made as to whether the certificate has been revoked. Typically, step 330 is performed by server 62. In a present embodiment, the certificate sent to server 62 at step 320 is sent within a digital certificate that is received at step 320. Thus, at step 330, a simple check in a digital certificate revocation list local to server 62, or otherwise accessible to server 62 via Internet 46, can be used to determine whether the certificate, and therefore any keys embedded therein, have been revoked. If revoked, then method 300 ends as no access to Internet 46 from device 50 will be permitted.

However, if the certificate has not been revoked at step 330, then method 300 will advance to step 340 at which point a determination is made as to whether the client identifier is correct. Recall from method 200 that the certificate received at step 320 will have a client identifier embedded therein. Thus, at step 340, server 62 will examine the contents of the certificate received at step 320 to extract the client identifier embedded therein. If the client identifier embedded in the certificate does not match the expected identity of the originator of the request for access from step 310, then it will be determined at step 340 that the client identifier at step 340 is incorrect, and method 300 will advance to step 360 and the certificate will be revoked, thereby preventing its further use, and method 300 will end.

The expected identity of the originator of the request for access from step 310 can be obtained in any desired manner, such as by examining the internet protocol ("IP") address of client device 50 that came with the request received at step 310 and/or by examining the MAC address embedded within the packets transmitted by client device 50. Having examined that IP address and ascertained the identity of the device that originated the request for access, when server 62 performs step 340, then server 62 can compare the ascertained identity of device 50 and verify that the ascertained identity matches the client identifier embedded within the certificate that was sent at step 320.

Thus, if at step 340 it is determined that the client identifier embedded within the certificate received at step 320 is correct, then method 300 advances to step 350.

At step 350, a determination is made as to whether the access server identifier is correct. Recall from method 200 that the certificate received at step 320 will have an access server identifier embedded therein. Thus, at step 340, server 62 will examine the contents of the certificate received at step 320 to extract the access server identifier embedded therein. If the access server identifier embedded in the certificate does not match the expected identity of access server 62, then it will be determined at step 350 that the access server identifier at step 350 is incorrect, and method 300 will advance to step 360 and the certificate will be revoked, thereby preventing its further use, and method 300 will end.

However, if at step 350 it is determined that the access server identifier is correct, then method 300 will advance to step 370 and access to network 42 and/or Internet 46 by device 50 will be permitted.

Figure 4:
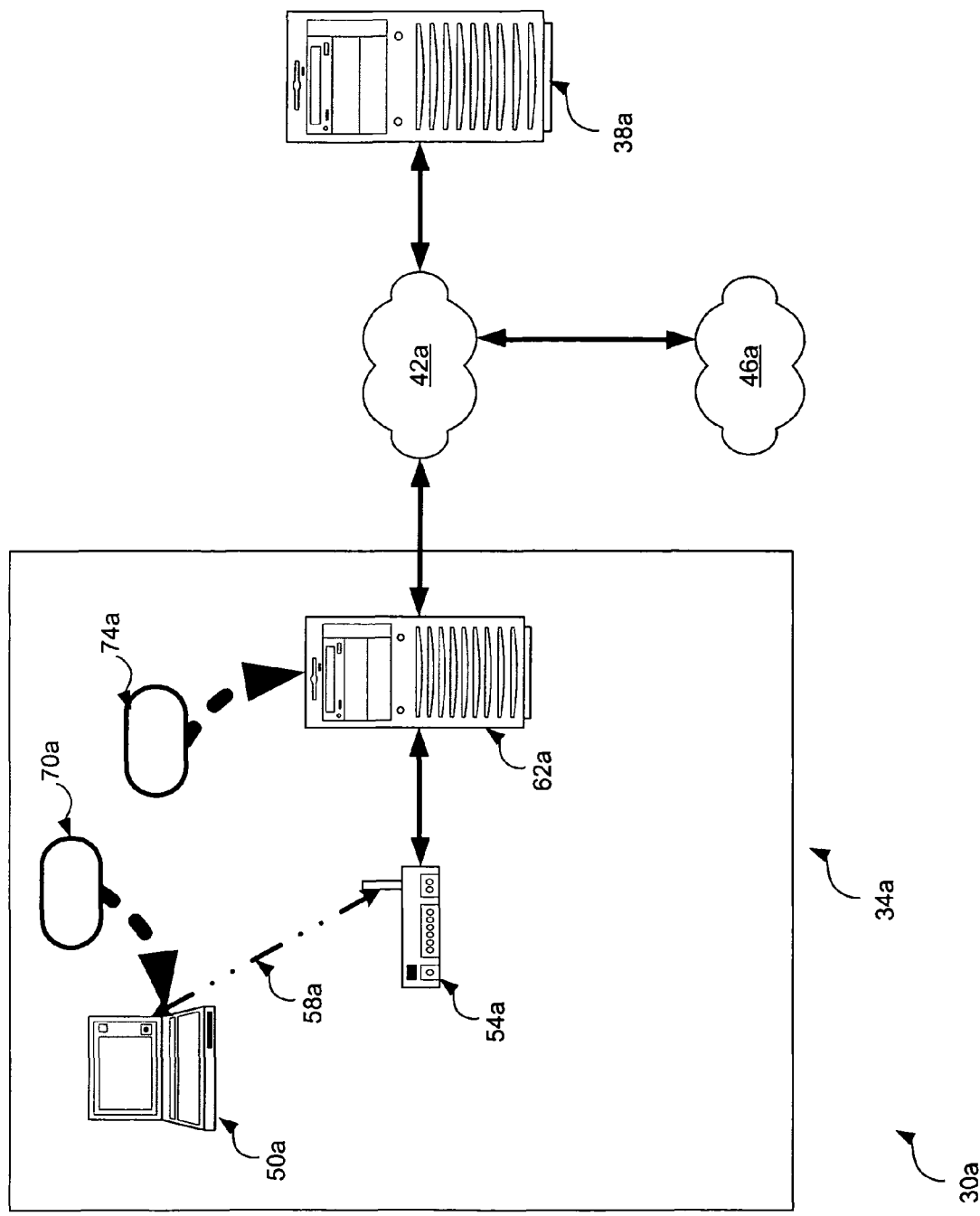
FIG. 4 is a schematic representation of a system for access control in accordance with another embodiment of the invention.

Referring now FIG. 4, a system for access control in accordance with another embodiment of the invention is indicated generally at 30*a*. System 30*a* includes similar elements to system 30, and like elements in system 30*a* include the same reference character as like elements in system 30, except followed with the suffix "a". Also shown on system 30*a* is a client device file indicated at 70*a* that is stored on device 50*a*. Additionally, system 30*a* includes an access server file indicated at 74*a* and which is stored on server 62*a*.

Figure 5:
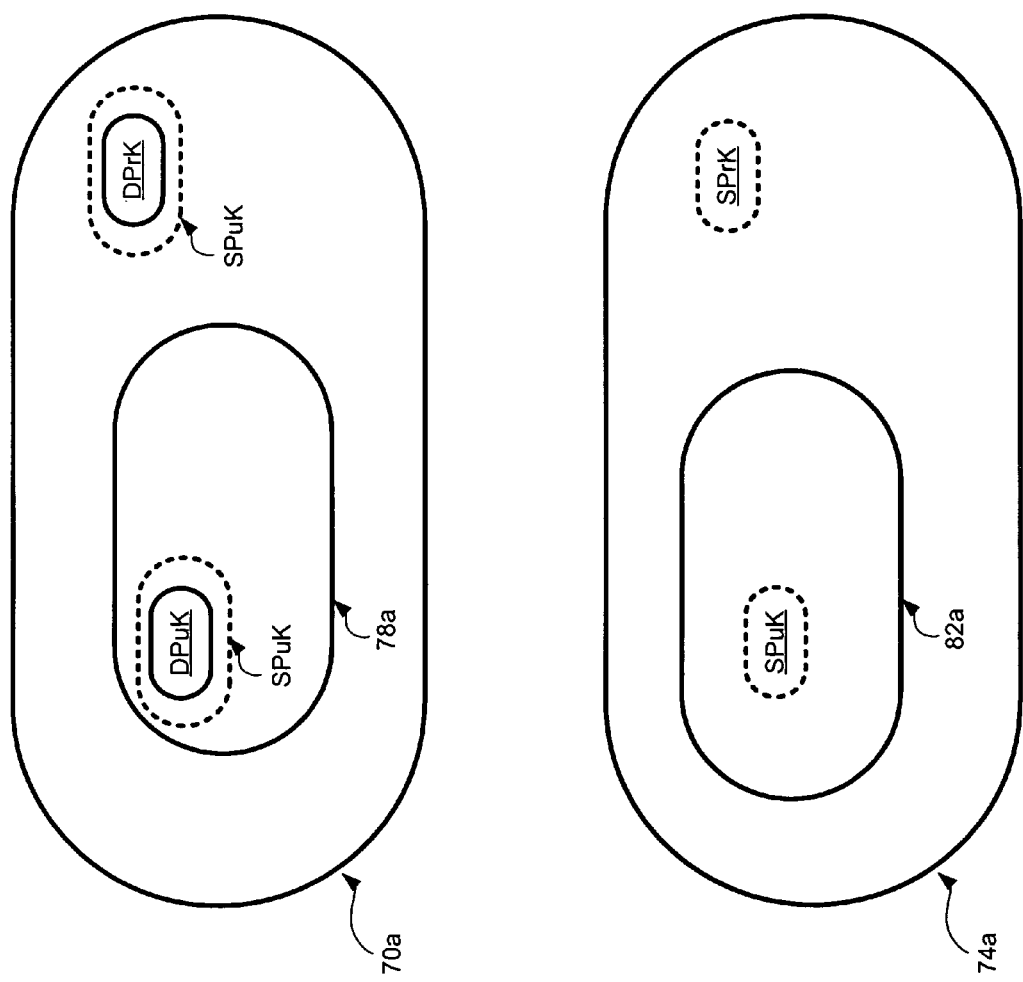
FIG. 5 is a schematic representation of files associated with the system of FIG. 4 in accordance with another embodiment of the invention.

Files 70*a* and 74*a* are shown in greater detail in FIG. 5. File 70*a* includes a client device certificate 78*a* and a device private key DPrK. Client device certificate 78*a* itself includes a device public key DPuK that corresponds with device private key DPrK. Collectively, device private key DPrK and device public key DPuK provide a key pair that can be used to sign or encrypt communications between device 50*a* and other components in system 50*a*. While not shown in FIG. 5, certificate 78*a* also contains the usual payload of other data that are typically found in digital certificates previously known to those of skill in the art.

File 74*a* includes a server certificate 82*a* and a server private key SPrK. Client device certificate 82*a* itself includes a server public key SPuK that corresponds with server private key SPrK. Collectively, server private key DPrK and server public key DPuK provide a key pair that can be used to sign and/or encrypt communications between server 50*a* and other components in system 50*a*. While not shown in FIG. 5, certificate 82*a* also contains the usual payload of other data that are typically found in digital certificates previously known to those of skill in the art.

Referring again to file 70*a*, device private key DPrK and device public key DPuK are each signed with server public key SPuK. The existence of this digital signature is represented by a dashed ellipse indicated at SPuK on file 70*a* that surrounds device private key DPrK and device public key DPuK on FIG. 5. It will now be apparent that file 70*a*, and certificate 74*a* contained therein, is a variant of the client device certificate described in relation to system 30, method 200 and method 300.

Figure 6:
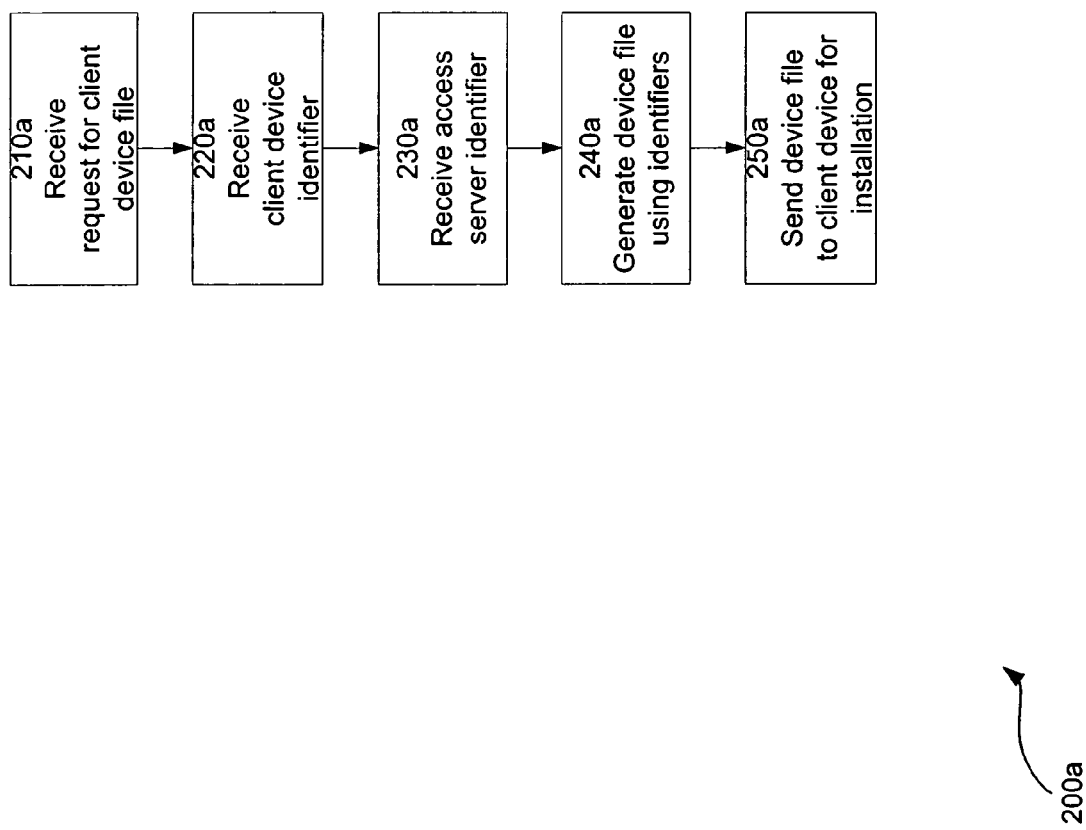
FIG. 6 shows a flow-chart depicting a method for generating a client device file in accordance with another embodiment of the invention.

Referring now to FIG. 6 a method for generating a client device file is indicated generally at 200*a*. Method 200*a* will now be explained with reference to the generation of file 70*a* in system 50*a*. Beginning first at step 210*a*, a request is received for a client device file. This step can be accomplished by sending any appropriate instruction to access server 38*a* to which access server 38*a* is configured to respond. Next, at step 220, a client device identifier is received. In a present embodiment, the identifier is simply the device private key DPrK and device public key DPuK, and thus step can involve either the generation of device private key DPrK and device public key DPuK by access server 38*a*, or by sending previously generated versions of device private key DPrK and device public key DPuK. Next, at step 230*a*, an access server identifier is received. In a present embodiment, the access server identifier is simply a server public key SPuK, and so this step can involve either the generation of server private key SPrK and server public key SPuK by access server 38*a*, or by sending a previously generated version of server public key SPuK to access server 38*a*. Next, at step 240*a*, a device file is generated by using the identifiers from steps 220*a* and 230*a*. In a present embodiment this step involves "signing" device private key DPrK and device public key DPuK with server public key SPuK, and thus creating the file shown at 70*a* in FIG. 5 as previously described. Next, at step 250*a*, the file created at step 240*a* is sent to device 50*a* for installation in the usual manner that certificates and associated private keys are installed on such devices.

Figure 7:
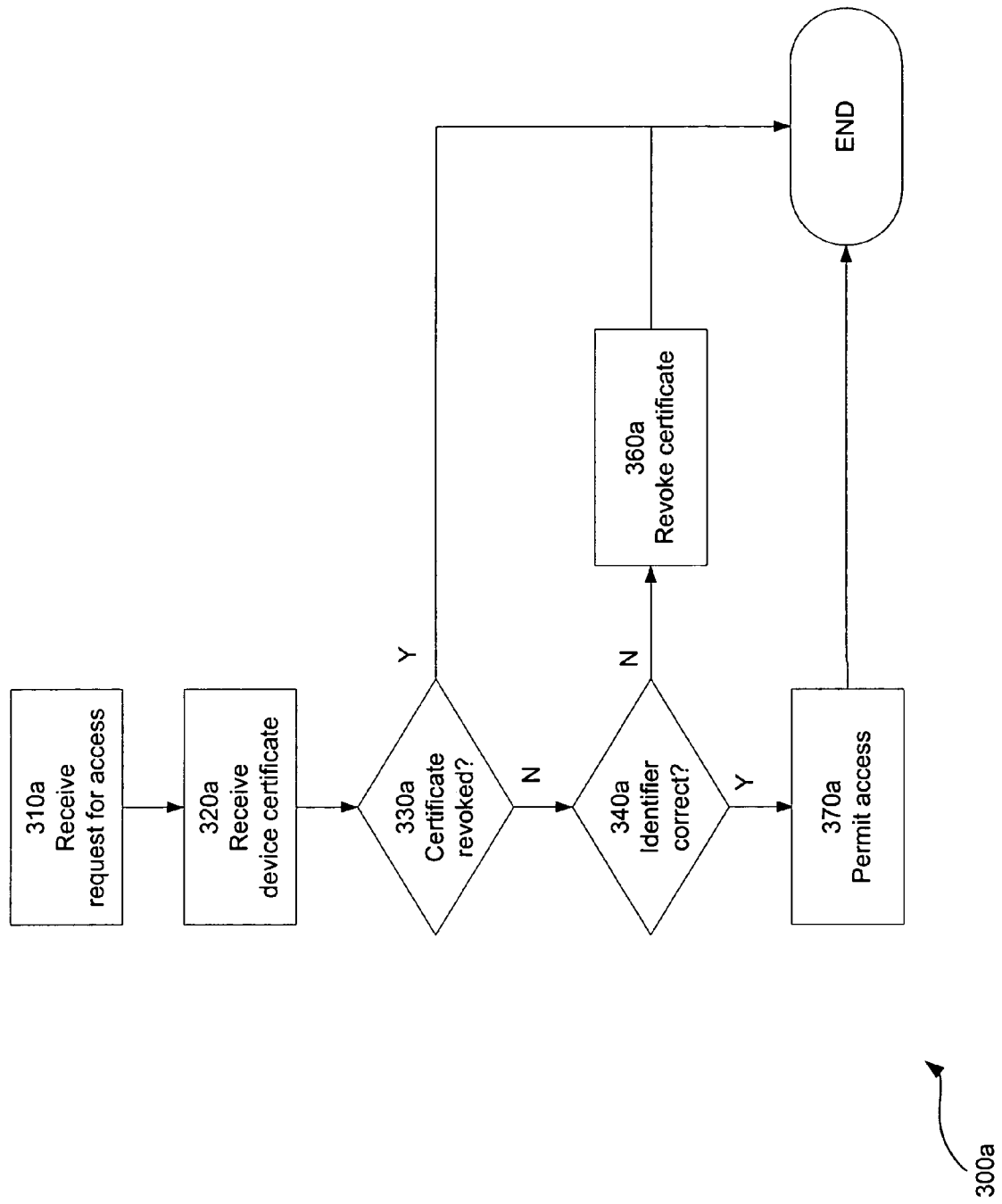
FIG. 7 shows a flow-chart depicting a method for access control in accordance with another embodiment of the invention.
Figure 8:
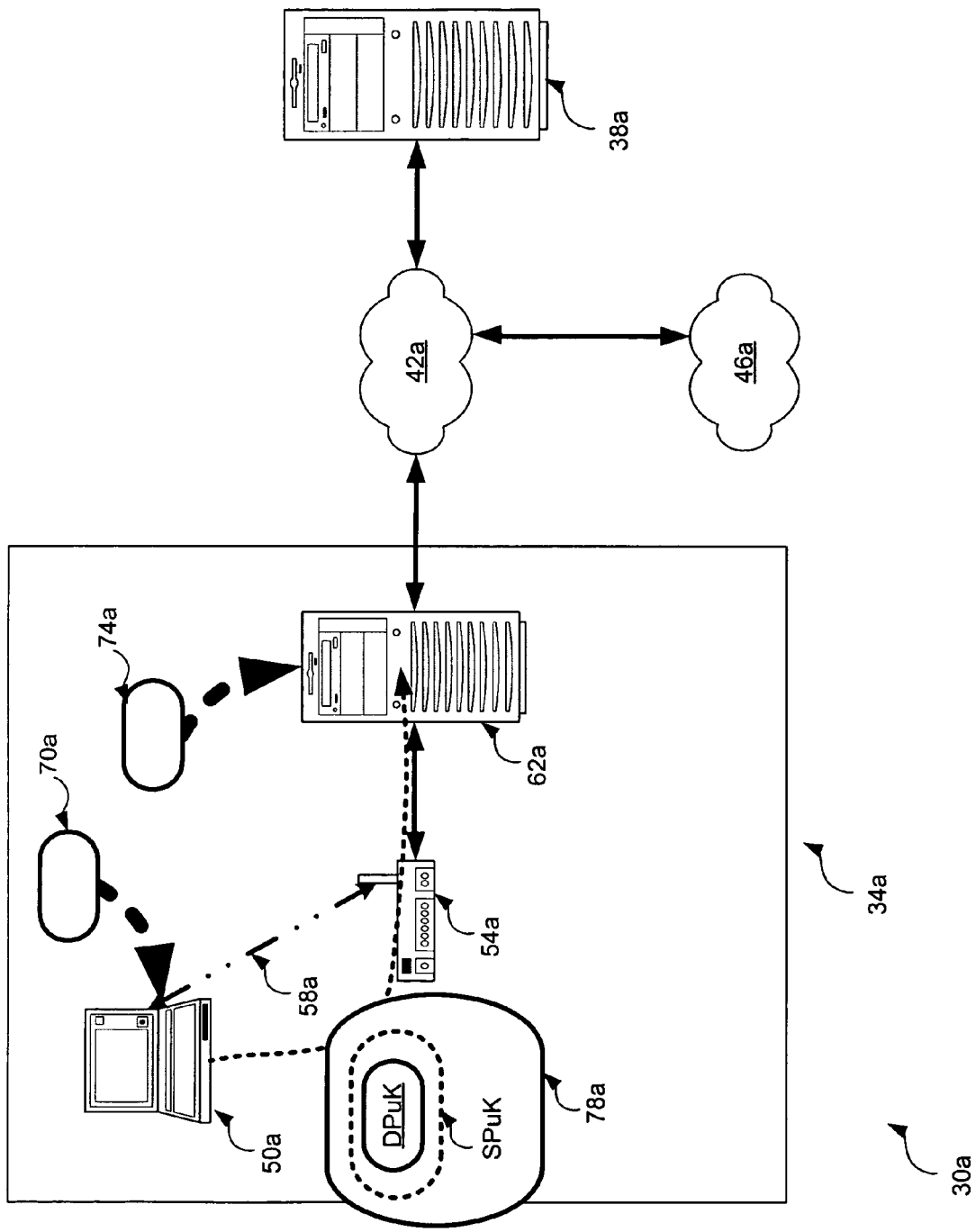
FIG. 8 shows the system of FIG. 4 during the performance of certain steps in the method of FIG. 7.

Referring now to FIG. 7 a method for controlling access is indicated generally at 300*a*. Method 300*a* will now be explained with reference to system 30*a*. At step 310*a*, a request for access is received. In system 30*a*, device 50*a* will thus attempt to access network 42*a* and/or Internet 46*a* in the usual manner over link 58*a* and via gateway 62*a*. Next, at step 320*a*, the client device certificate is received. This step is represented in FIG. 8, as certificate 78*a* is sent to gateway 62*a* via link 58*a*. At step 330*a*, a determination is made as to whether the certificate is revoked. Step 330*a* is performed by server 62*a*, which uses a certificate revocation list that is local to server 62*a* and/or a public certificate revocation list that is available to server 62*a* over network 42*a* and/or Internet 46*a* to determine whether certificate 78*a* is valid. If certificate 78*a* is revoked, then method 300*a* ends without providing access to network 42*a* and/or Internet 46*a* to device 50*a*. However, if certificate 78*a* is valid, then method 300*a* advances to step 340*a*.

At step 340*a* a determination is made as to whether an identifier is valid. In system 30*a*, the determination is made by having server 62*a* examine certificate 78*a* for identifiers embedded therein for correctness. In a present embodiment, the valid identifier is based on whether the correct server public key was used to sign device public key DPuK. Thus, server 62*a* will extract device public key DPuK from certificate 78*a*, and, server 62*a* will also use its server private key SPrK to verify the accuracy of the server public key SPuK signature that was used to sign device public key DPuK. If such a verification shows that the wrong signature is associated with device public key DPuK, then a determination will be made at step 340*a* that the identifier was not correct, and method 300*a* will advance to step 360*a* at which point certificate 78*a* will be revoked. Such revocation can be performed using any desired means, such as having server 62*a* inform either a local or remote certificate revocation list that certificate 78*a* is revoked.

However, if the determination at step 340*a* shows that server public key SPuK was used to sign device public key DPuK within certificate 78*a*, then it will be determined that the identifier is correct and method 300*a* will advance to step 370*a* and access to network 42*a* and/or Internet 46*a* by device 50*a* will be permitted. Such access can involve secure communications over link 58*a*, as device public key DPuK can be used to encrypt communications from server 62*a* to device 50*a* over link 58*a*, and/or server public key SPuK can be used to encrypt communications from device 50*a* to server 62*a* over link 58*a*.

Figure 9:
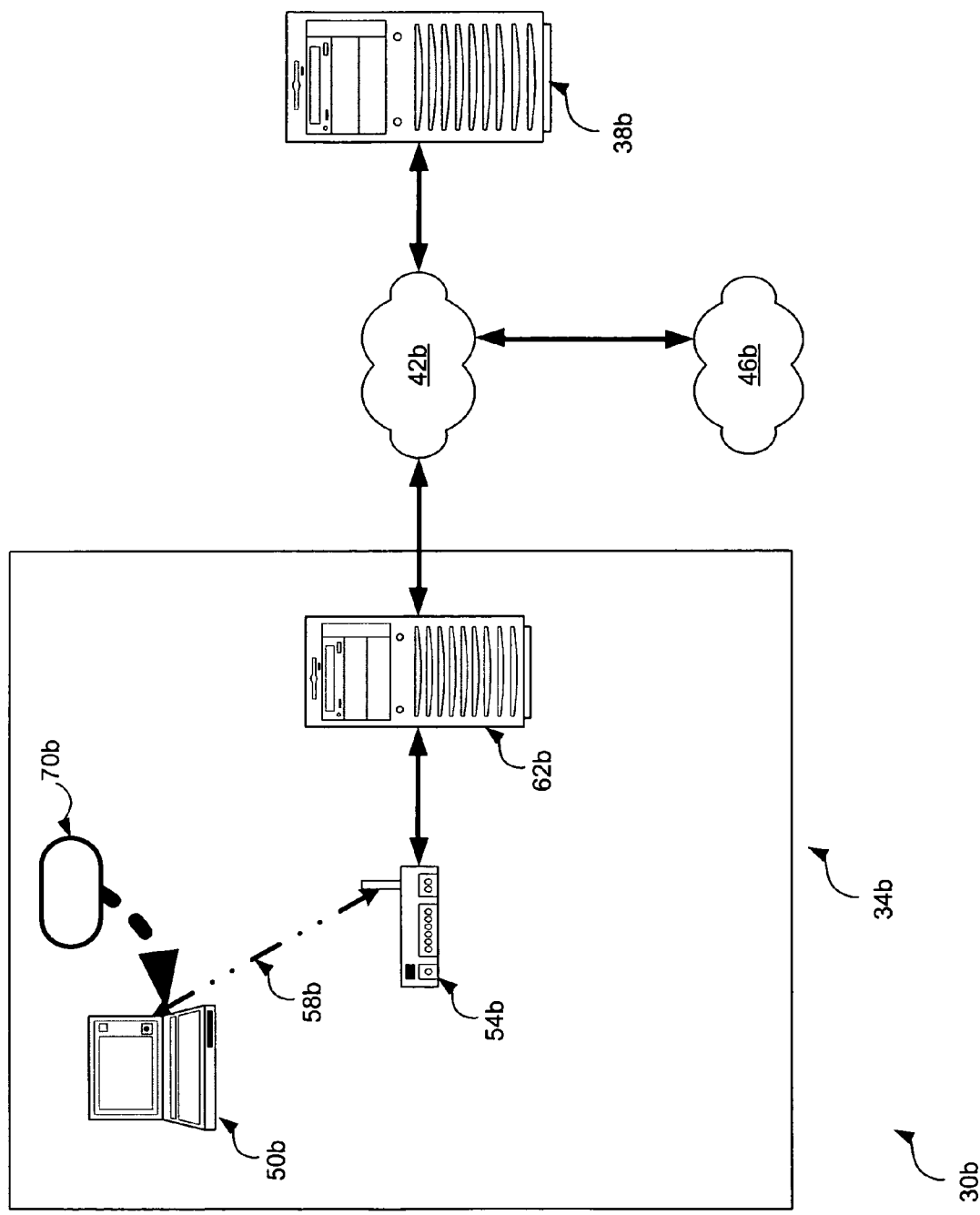
FIG. 9 is a schematic representation of a system for access control in accordance with another embodiment of the invention.

Referring now FIG. 9, a system for access control in accordance with another embodiment of the invention is indicated generally at 30*b*. System 30*b* includes similar elements to system 30, and like elements in system 30*b* include the same reference character as like elements in system 30, except followed with the suffix "b". Also shown on system 30*b* is a client device file indicated at 70*b* that is stored on device 50*b*.

Figure 10:
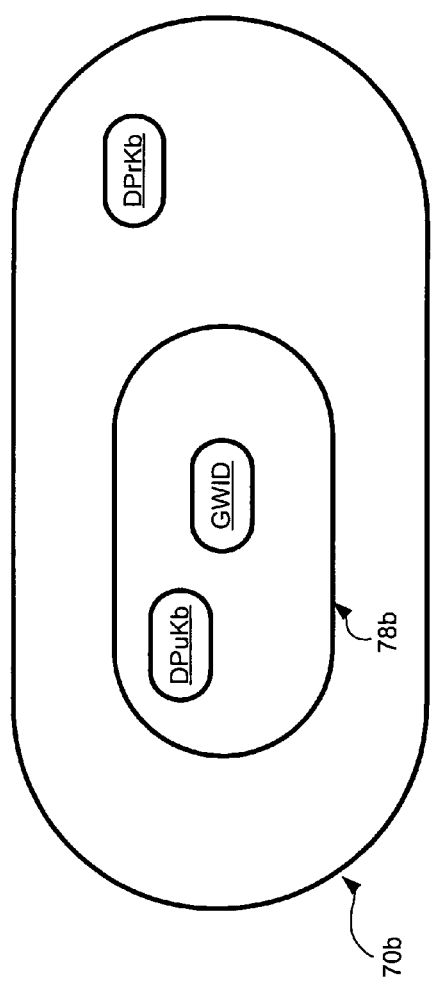
FIG. 10 is a schematic representation of files associated with the system of FIG. 9 in accordance with another embodiment of the invention.

File 70*b* is shown in greater detail in FIG. 10. File 70*b* includes a client device certificate 78*b* and a device private key DPrKb. Client device certificate 78*b* itself includes a device public key DPuKb that corresponds with device private key DPrKb. Collectively, device private key DPrKb and device public key DPuKb provide a key pair that can be used to sign or encrypt communications between device 50*b* and other components in system 30*b*, typically server 62*b*. Certificate 78*b* also includes a gateway identifier GWID. Gateway identifier GWID can be any unique identifier specifically associated with gateway 62*b*, such as a serial number associated with the central processing unit of gateway 62*b*, or a unique machine name assigned to gateway 62*b*, or a harddrive identifier unique to a hard disc drive in gateway 62*b*. While not shown in FIG. 10, certificate 78*b* also contains the usual payload of other data that are typically found in digital certificates previously known to those of skill in the art.

It will now be apparent that file 70*b*, and certificate 74*b* contained therein, is a variant of the file 70*a* described in relation to system 30*a*, method 200*a* and method 300*a*. Thus, it will also now be apparent that method 200*a* can be suitable modified to generate file 70*b*, and that method 300*a* can be modified to control access. Specifically in relation to method 300*a*, step 340*a* will be modified to simply determine whether the gateway identifier GWID matches the gateway identifier GWID that is uniquely, and locally present on gateway 62*b*. If present, then access will be permitted to network 42*b* and/or Internet 46*b*. If that gateway identifier is not locally present, then access will be denied and the certificate 74*b* will be revoked.

Figure 11:
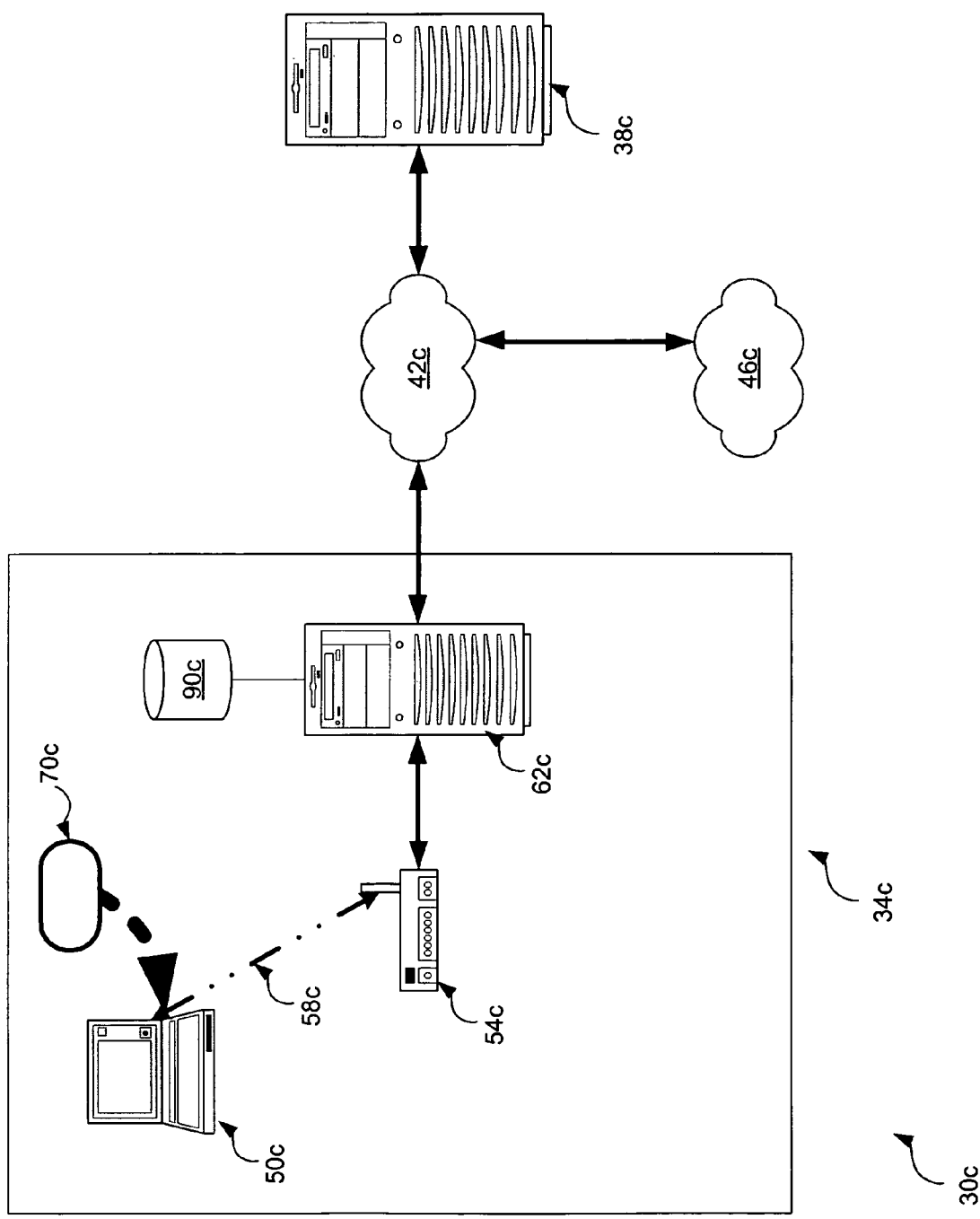
FIG. 11 is a schematic representation of a system for access control in accordance with another embodiment of the invention.

Referring now FIG. 11, a system for access control in accordance with another embodiment of the invention is indicated generally at 30*c*. System 30*c* includes similar elements to system 30, and like elements in system 30*c* include the same reference character as like elements in system 30, except followed with the suffix "c". Also shown on system 30*c* is a client device file indicated at 70*c* that is stored on device 50*c*. Also shown on system 30*c* is a client identifier database 90*c* that is connected to gateway 62*c*.

Figure 12:
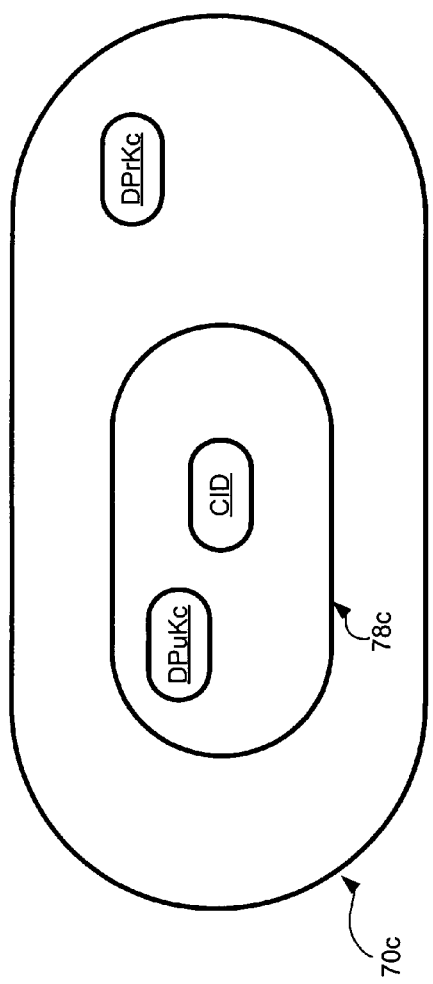
FIG. 12 is a schematic representation of files associated with the system of FIG. 11 in accordance with another embodiment of the invention; and, FIG. 13 is a schematic representation of a system for access control in accordance with another embodiment of the invention.

File 70*c* is shown in greater detail in FIG. 12. File 70*b* includes a client device certificate 78*c* and a device private key DPrKc. Client device certificate 78*c* itself includes a device public key DPuKc that corresponds with device private key DPrKc. Collectively, device private key DPrKc and device public key DPuKc provide a key pair that can be used to sign or encrypt communications between device 50*c* and other components in system 30*c*, typically server 62*c*. Certificate 78*c* also includes a client identifier CID. Client identifier CID can be any unique identifier specifically associated with client 50*c*, such as a serial number associated with the central processing unit of client 50*c*, or a unique machine name assigned to client 50*c*, or a hard-drive identifier unique to a hard disc drive in client 50*c*. While not shown in FIG. 12, certificate 78*c* also contains the usual payload of other data that are typically found in digital certificates previously known to those of skill in the art.

It will now be apparent that file 70*c*, and certificate 78*c* contained therein, is a variant of the file 70*b* described in relation to system 30*a*, method 200*a* and method 300*a*. Thus, it will also now be apparent that method 200*a* can be suitably modified to generate file 70*c*, and that method 300*c* can be modified to control access. Specifically in relation to method 300*a*, step 340*a* will be modified to simply determine whether the client identifier CID matches a list of known client identifiers CID that are stored on client identifier database 90*c*. If the client identifier CID does match one of the known client identifiers CID present on database 90*c*, then access will be permitted to network 42*c* and/or Internet 46*c*. If that client identifier CID is not present, then access will be denied and the certificate 74*c* will be revoked. (It should be understood that database 90*c* could be inside server 62*c* or remotely located therefrom.)

Figure 13:
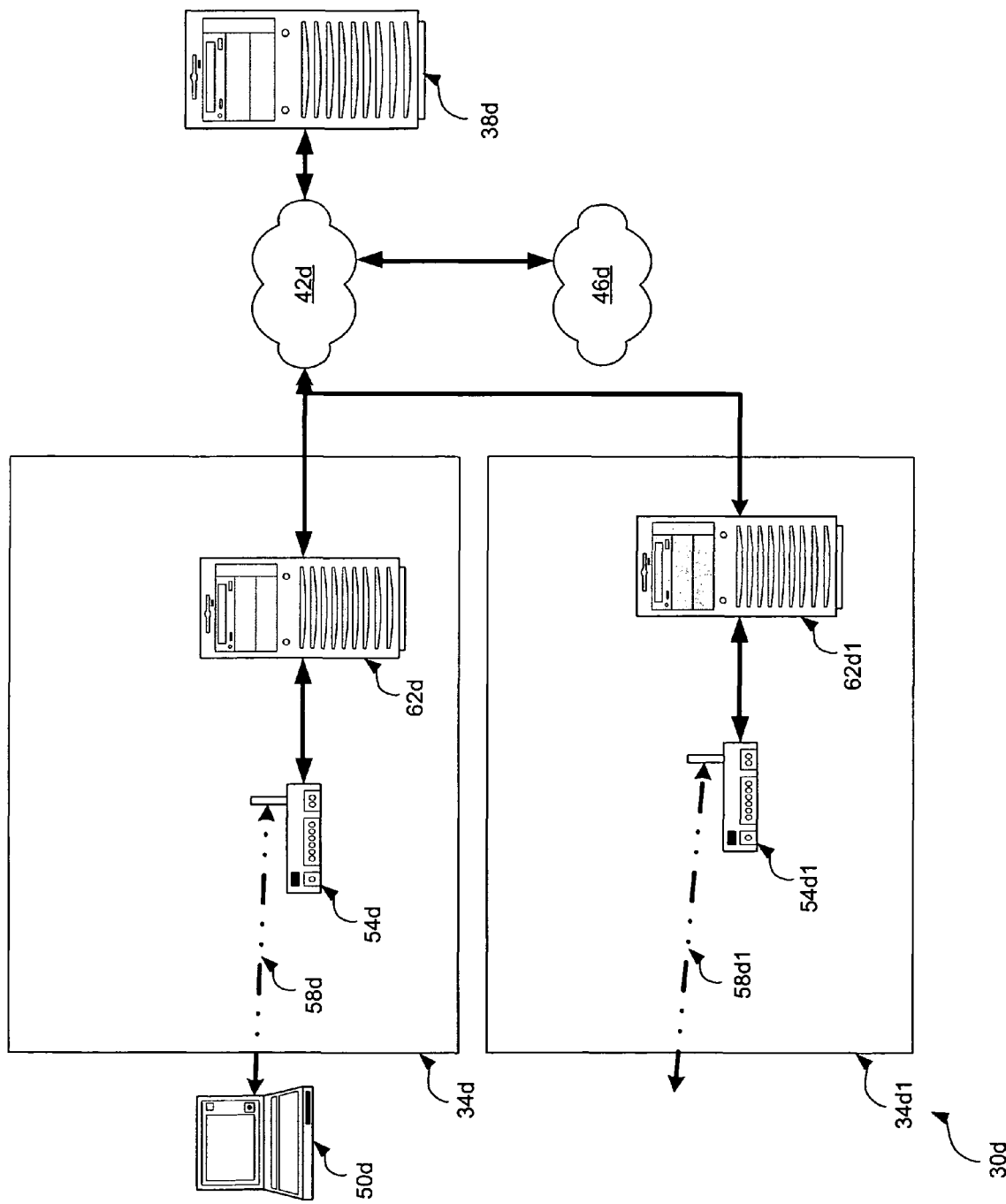

It will now be apparent that as long as device 50, (or its variants 50*a*, 50*b* and 50*c*) is used within its corresponding local network 34 to its corresponding access server 62, then when method 300 (or its variants) is performed device 50 will typically be granted access to network 42 and/or Internet 46, (unless some other intervening event causes the revocation of the certificate for device 50). However, in the event that device 50 is used to attempt to access network 42 and/Internet 46 via another access server other than access server 62, then such access will be denied and any certificate associated with that device 50 will be revoked. This is shown in greater detail in FIG. 13, wherein a system for access control in accordance with another embodiment of the invention is indicated generally at 30*d*. System 30*d* can be based on any one of systems 30, 30*a*, 30*b* and 30*c* or combinations thereof. System 30*d* includes two networks 34*d* and 34*d*1 that each connect to network 42*d* and Internet 46*d*. Network 34*d* includes device 50*d* and server 62*d*, and it is assumed that device 50*d* has a file 70*d* stored thereon that is associated with server 62*d* using an appropriate version of the methods previously described. Thus, device 50*d* will be able to access network 42*d* via server 62*d* as previously described. However, in the event that device 50*d* attempts to access server 62*d*1 via link 58*d*1, then device 50*d* will be denied access network 42*d* as file 70*d* stored on device 50*d* is not associated with server 62*d*1. It should now be apparent that the teachings herein can be used to provide a standardized system for access control and method across multiple networks, while limiting access of client devices to only desired one(s) of those networks.

It will now also be understood that system 30*d* is scalable, and thus can be modified to include plurality of networks 34*d*, and a plurality of client devices 50*d* can be configured for access to one or more of those networks 34*d*.

While only specific combinations of the various features and components of the present invention have been discussed herein, it will be apparent to those of skill in the art that desired subsets of the disclosed features and components and/or alternative combinations of these features and components can be utilized, as desired. For example, step 220 or step 230 can be eliminated from method 200, such that only one of the client device identifier or the access server identifier is actually embedded in the key. By the same token, step 340 or step 350, respectively, can be eliminated from method 300, as only a single check is performed according to which identifier is actually embedded in the key.

As an additional example, it is to be understood that various combinations of systems 30, 30a, 30b, and 30c are within the scope of the invention. For example, the entirety or portions of contents of files 70a, 70b, 70c could be combined with each other provided the corresponding hardware and software changes are made to the remainder of the associated system 30 (and its variants) in order to accommodate such combinations. Similarly, a file such as file 74a, suitably modified, could be effected for use in conjunction with files 70b, or 70c, as desired, according to appropriate modifications and context.

Additionally, it is to be understood that various ways of implementing the unique identifiers for either the computing device and the access server are contemplated. For example, prior to transmission of the certificate by the computing device, the certificate could be encrypted with an encryption operation known to the access server. The encryption operation can be based on a password known to only the computing device and the access server dedicated to providing access to that computing device. Thus, the encryption certificate can be encrypted by the computing device using the password. In this manner, only the access server dedicated to that computing device will be able to decrypt the encryption key. In the event that the access server fails to decrypt the key, then the access server will determine that the computing device is attempting unauthorized access to the computing resource, and thus prevent such access.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. In a gateway server, a method of controlling access to a resource, comprising:
   receiving a digital certificate from a device;
   extracting at least one identifier embedded into said certificate, said at least one extracted identifier including an extracted gateway identifier;
   determining if said at least one extracted identifier is valid, wherein said determining comprises at least comparing said extracted gateway identifier with a local store of a valid gateway identifier associated with said gateway server;
   permitting said device to access said resource if said at least one extracted identifier is determined to be valid; and,
   denying said device access to said resource and revoking said certificate if said at least one extracted identifier is determined to be invalid.

2. The method of claim 1 further comprising determining whether said certificate has been revoked, and, if said certificate has been revoked, denying said device access to said resource.

3. The method of claim 1, wherein said valid gateway identifier is selected from the group consisting of a serial number associated with a central processing unit of said gateway server; a hard drive identifier associated with a hard drive local to said gateway server; a unique name of said gateway server; a name associated with a set of machines including said gateway server.

4. The method of claim 1, wherein said at least one extracted identifier comprises a plurality of extracted identifiers and wherein said determining if said at least one extracted identifier is valid comprises determining if each of said plurality of extracted identifiers is valid.

5. The method of claim 4, wherein said plurality of extracted identifiers comprises, in addition to said extracted gateway identifier, an extracted device identifier.

6. The method of claim 5, wherein said step of determining if each of said plurality of extracted identifiers is valid comprises, in addition to comparing said extracted gateway identifier with a local store of said valid gateway identifier, comparing said extracted device identifier with a list of one or more valid device identifiers for at least one of the gateway server and the resource.

7. The method of claim 5, wherein said step of determining if each of said plurality of extracted identifiers is valid comprises, in addition to comparing said extracted gateway identifier with a local store of said valid gateway identifier, receiving a second device identifier from the device and comparing said extracted device identifier with said second device identifier, said extracted device identifier being valid if said extracted device identifier is equivalent to said second device identifier.

8. The method of claim 5, wherein said certificate includes a device public encryption key associated with said device and said plurality of extracted identifiers further comprises a digital signature generated by signing said device public encryption key with a gateway server public encryption key associated with said gateway server; and wherein said step of determining if each of said plurality of extracted identifiers is valid comprises, in addition to comparing said extracted gateway identifier with a local store of said valid gateway identifier, determining a validity of said digital signature using a gateway server private encryption key, said digital signature being invalid if said digital signature cannot be verified using said gateway server private encryption key.

9. The method of claim 4, wherein said certificate includes a device public encryption key associated with said device and said plurality of extracted identifiers comprises an device identifier and a digital signature generated by signing said device public encryption key with a gateway server public encryption key associated with said gateway server; and wherein said step of determining if each of said plurality of extracted identifiers is valid comprises, in addition to comparing said extracted gateway identifier with a local store of said valid gateway identifier, determining if said extracted device identifier is valid; and
   determining a validity of said digital signature using a gateway server private encryption key, said digital signature being invalid if said digital signature cannot be verified using said gateway server private encryption key.

10. The method of claim 9, wherein the step of determining if said extracted device identifier is valid comprises comparing said extracted device identifier with a list of one or more valid device identifiers for at least one of the gateway server and the resource.

11. The method of claim 9, wherein the step of determining if said extracted device identifier is valid comprises receiving a second device identifier from the device and comparing said extracted device identifier with said second device identifier, said extracted device identifier being valid if said extracted device identifier is equivalent to said second device identifier.

12. The method of claim 1 wherein said resource is selected from the group consisting of at least one of the Internet and a local area network.

13. A gateway server comprising a first interface for connection to a local device and a second interface for connection to a resource, said server further comprising a microcomputer intermediate said interfaces, said microcomputer operable to receive a request for access to said resource from said device, said request including a certificate received from said device, said microcomputer operable to extract at least one identifier embedded into said certificate, said at least one extracted identifier including an extracted gateway identifier, said microcomputer further operable to determine if said at least one extracted identifier is valid, said microcomputer further operable to permit said device to access said resource if said at least one extracted identifier is determined to be valid; and to deny said device access to said resource and revoke said certificate if said at least one extracted identifier is determined to be invalid, wherein to determine whether said at least one extracted identifier is valid, said microcomputer is operable to compare said extracted gateway identifier with a local store of a valid gateway identifier associated with said gateway server.

14. The gateway server of claim 13 wherein said microcomputer is further operable to determine whether said certificate has been revoked using a certificate revocation list and, if said certificate has been revoked, denying said device access to said resource.

15. The gateway server of claim 13, wherein said valid gateway identifier is selected from the group consisting of a serial number associated with a central processing unit of said gateway server; a hard drive identifier associated with a hard drive local to said gateway server; a unique name of said gateway server; a name associated with a set of machines including said gateway server.

16. The gateway server of claim 13, wherein said at least one extracted identifier comprises a plurality of extracted identifiers and wherein said microcomputer is operable to permit said device to access said resource if each of said plurality of extracted identifiers is valid.

17. The gateway server of claim 16 wherein said plurality of extracted identifiers comprises, in addition to said extracted gateway identifier, an extracted device identifier.

18. The gateway server of claim 17, wherein said extracted gateway identifier is determined to be valid if said extracted gateway identifier is equivalent to said valid gateway identifier; and wherein said extracted device identifier is determined to be valid if said extracted device identifier is within a list of one or more valid device identifiers.

19. The gateway server of claim 17, wherein said extracted gateway identifier is determined to be valid if said extracted gateway identifier is equivalent to said valid gateway identifier; and wherein said extracted device identifier is determined to be valid if said extracted device identifier is equivalent to a second device identifier received from said device.

20. The gateway server of claim 17, wherein said certificate includes a device public encryption key associated with said device and said plurality of extracted identifiers further comprises a digital signature generated by signing said device public encryption key with a gateway server public encryption key associated with said gateway server; and wherein said digital signature is determined to be invalid if said digital signature cannot be verified using said gateway server private encryption key.

21. The gateway server of claim 16, wherein said certificate includes a device public encryption key associated with said device and said plurality of extracted identifiers comprises an extracted device identifier a digital signature generated by signing said device public encryption key with a gateway server public encryption key associated with said gateway server.

22. The gateway server of claim 21, wherein said extracted device identifier is determined to be valid if said extracted device identifier is within a list of one or more valid device identifiers; and wherein said digital signature is determined to be invalid if said digital signature cannot be verified using said gateway server private encryption key.

23. The gateway server of claim 21, wherein said extracted device identifier is determined to be valid if said extracted device identifier is equivalent to a second device identifier received from said device; and wherein said digital signature is determined to be invalid if said digital signature cannot be verified using said gateway server private encryption key.

24. The gateway server of claim 13 wherein said resource is selected from the group consisting of at least one of the Internet and a local area network.

25. A non-transitory computer readable media containing a set of programming instructions for use in a gateway server, said instructions including a method of controlling access to a resource comprising:
    receiving a digital certificate from a device;
    extracting at least one identifier embedded into said certificate, said at least one extracted identifier including an extracted gateway identifier;
    determining if said at least one extracted identifier is valid, wherein said determining comprises at least comparing said extracted gateway identifier with a local store of a valid gateway identifier associated with said gateway server;
    permitting said device to access said resource if said at least one extracted identifier is determined to be valid; and,
    denying said device access to said resource and revoking said certificate if said at least one extracted identifier is determined to be invalid.

26. In a gateway server, a method of controlling access to a resource, comprising:
    receiving a digital certificate from a device;
    extracting at least one identifier embedded into said certificate, said at least one extracted identifier including an extracted device identifier;
    determining if said at least one extracted identifier is valid, wherein said determining comprises comparing said extracted device identifier with a list of two or more device identifiers considered to be valid;
    permitting said device to access said resource if said at least one extracted identifier is determined to be valid; and,
    denying said device access to said resource and revoking said certificate if said at least one extracted identifier is determined to be invalid.

27. The method of claim 26, wherein the two or more device identifiers are considered to be valid for at least one of the gateway server and the resource.

28. The method of claim 26, wherein the two or more device identifiers are considered to be valid for the gateway server.

29. The method of claim 26, further comprising determining whether said certificate has been revoked, and, if said certificate has been revoked, denying said device access to said resource.

30. The method of claim 26, wherein said list of two or more device identifiers considered to be valid includes at least one of: a serial number associated with a central processing unit of said device; a hard drive identifier associated with a hard drive local to said device; a unique name of said device.

31. The method of claim 26, wherein said at least one extracted identifier comprises a plurality of extracted identifiers and wherein said determining if said at least one extracted identifier is valid comprises determining if each of said plurality of extracted identifiers is valid.

32. The method of claim 31, wherein said plurality of extracted identifiers comprises, in addition to said extracted device identifier, an extracted gateway identifier associated with said gateway server.

33. The method of claim 32, wherein said step of determining if each of said plurality of extracted identifiers is valid comprises, in addition to comparing said extracted device identifier with said list of two or more device identifiers considered to be valid, comparing said extracted gateway identifier with a local store of a valid gateway identifier.

34. The method of claim 26, wherein said certificate includes a device public encryption key associated with said device and said plurality of extracted identifiers further comprises a digital signature generated by signing said device public encryption key with a gateway server public encryption key associated with said gateway server; and wherein said step of determining if each of said plurality of extracted identifiers is valid comprises, in addition to comparing said extracted device identifier with said list of two or more device identifiers considered to be valid, determining a validity of said digital signature using a gateway server private encryption key, said digital signature being invalid if said digital signature cannot be verified using said gateway server private encryption key.

35. The method of claim 26, wherein said certificate includes a device public encryption key associated with said device and said plurality of extracted identifiers comprises a gateway identifier and a digital signature generated by signing said device public encryption key with a gateway server public encryption key associated with said gateway server; and wherein said step of determining if each of said plurality of extracted identifiers is valid comprises, in addition to comparing said extracted device identifier with a list of two or more device identifiers considered to be valid, determining if said extracted gateway identifier is valid; and determining a validity of said digital signature using a gateway server private encryption key, said digital signature being invalid if said digital signature cannot be verified using said gateway server private encryption key.

36. The method of claim 35, wherein the step of determining if said extracted gateway identifier is valid comprises comparing said extracted gateway identifier with a local store of a valid gateway identifier.

37. The method of claim 26, wherein said resource is selected from the group consisting of at least one of the Internet and a local area network.

38. A gateway server comprising a first interface for connection to a local device and a second interface for connection to a resource, said server further comprising a microcomputer intermediate said interfaces, said microcomputer operable to receive a request for access to said resource from said device, said request including a certificate received from said device, said microcomputer operable to extract at least one identifier embedded into said certificate, said at least one extracted identifier including an extracted device identifier, said microcomputer further operable to determine if said at least one extracted identifier is valid, said microcomputer further operable to permit said device to access said resource if said at least one extracted identifier is determined to be valid; and to deny said device access to said resource and revoke said certificate if said at least one extracted identifier is determined to be invalid, wherein to determine whether said at least one extracted identifier is valid, said microcomputer is operable to compare said extracted device identifier with a list of two or more device identifiers considered to be valid.

39. The gateway server of claim 38, wherein said microcomputer is further operable to determine whether said certificate has been revoked using a certificate revocation list and, if said certificate has been revoked, denying said device access to said resource.

40. The gateway server of claim 38, wherein said list of two or more device identifiers considered to be valid includes at least one of: a serial number associated with a central processing unit of said device; a hard drive identifier associated with a hard drive local to said device; a unique name of said gateway server; a unique name of said device.

41. The gateway server of claim 38, wherein said at least one extracted identifier comprises a plurality of extracted identifiers and wherein said microcomputer is operable to permit said device to access said resource if each of said plurality of extracted identifiers is valid.

42. The gateway server of claim 41, wherein said plurality of extracted identifiers comprises, in addition to said extracted device identifier, an extracted gateway identifier associated with said gateway server.

43. The gateway server of claim 42, wherein said extracted device identifier is determined to be valid if said extracted device identifier is within said list of two or more device identifiers considered to be valid, and wherein said extracted gateway identifier is determined to be valid if said extracted gateway identifier is equivalent to a local store of a valid gateway identifier.

44. The gateway server of claim 38, wherein said certificate includes a device public encryption key associated with said device and said plurality of extracted identifiers further comprises a digital signature generated by signing said device public encryption key with a gateway server public encryption key associated with said gateway server; wherein said extracted device identifier is determined to be valid if said extracted device identifier is within said list of two or more device identifiers considered to be valid; wherein said digital signature is determined to be invalid if said digital signature cannot be verified using said gateway server private encryption key.

45. The gateway server of claim 38, wherein said certificate includes a device public encryption key associated with said device and said plurality of extracted identifiers further comprises a gateway identifier and a digital signature generated by signing said device public encryption key with a gateway server public encryption key associated with said gateway server; wherein said extracted device identifier is determined to be valid if said extracted device identifier is within said list of two or more device identifiers considered to be valid; wherein said digital signature is determined to be invalid if said digital signature cannot be verified using said gateway server private encryption key.

46. The method of claim 45, wherein said extracted gateway identifier is determined to be valid if said extracted gateway identifier is equivalent to a local store of a valid gateway identifier.

47. The gateway server of claim 38, wherein said resource is selected from the group consisting of at least one of the Internet and a local area network.

48. A non-transitory computer-readable medium containing a set of programming instructions for use in a gateway server, said instructions including a method of controlling access to a resource comprising:
receiving a digital certificate from a device;
extracting at least one identifier embedded into said certificate, said at least one extracted identifier including an extracted device identifier;
determining if said at least one extracted identifier is valid, wherein said determining comprises comparing said extracted device identifier with a list of two or more device identifiers considered to be valid;

permitting said device to access said resource if said at least one extracted identifier is determined to be valid; and, denying said device access to said resource and revoking said certificate if said at least one extracted identifier is determined to be invalid.

49. A method of controlling access to a resource via a gateway server, comprising:

receiving a digital certificate from a device, said certificate including a device public encryption key associated with said device;

extracting at least one identifier embedded into said certificate, said at least one extracted identifier including a digital signature generated by signing said device public encryption key with a gateway server public encryption key associated with said gateway server;

determining if said at least one extracted identifier is valid, wherein said determining comprises at least determining a validity of said digital signature using a gateway server private encryption key;

permitting said device to access said resource if said at least one extracted identifier is determined to be valid; and, denying said device access to said resource and revoking said certificate if said at least one extracted identifier is determined to be invalid.

50. The method of claim 49, further comprising sending said certificate to the device prior to said receiving.

51. The method of claim 50, wherein said sending is carried out in response to receipt of a request for certificate from the device.

52. The method of claim 50, wherein said digital signature is determined to be invalid if said digital signature cannot be verified using said gateway server private encryption key.

53. The method of claim 50, further comprising determining whether said certificate has been revoked, and, if said certificate has been revoked, denying said device access to said resource.

54. The method of claim 50, wherein said at least one extracted: identifier comprises a plurality of extracted identifiers and wherein said determining if said at least one extracted identifier is valid comprises determining if each of said plurality of extracted identifiers is valid.

55. The method of claim 54, wherein said plurality of extracted identifiers comprises, in addition to said digital signature, an extracted gateway identifier associated with said gateway server.

56. The method of claim 55, wherein said step of determining if each of said plurality of extracted identifiers is valid comprises, in addition to determining the validity of said digital signature using the gateway server private encryption key, comparing said extracted gateway identifier with a local store of a valid gateway identifier.

57. The method of claim 54, wherein said plurality of extracted identifiers comprises, in addition to said digital signature, an extracted device identifier.

58. The method of claim 57, wherein said step of determining if each of said plurality of extracted identifiers is valid comprises, in addition to determining the validity of said digital signature using the gateway server private encryption key, determining a validity of said extracted device identifier.

59. The method of claim 58, wherein determining a validity of said extracted device identifier comprises comparing said extracted device identifier with a list of one or more valid device identifiers for at least one of the gateway server and the resource.

60. The method of claim 58, wherein determining a validity of said extracted device identifier comprises receiving a second device identifier from the device and comparing said extracted device identifier with said second device identifier, said extracted device identifier being valid if said extracted device identifier is equivalent to said second device identifier.

61. The method of claim 50, wherein said resource is selected from the group consisting of at least one of the Internet and a local area network.

62. A gateway server comprising a first interface for connection to a local device and a second interface for connection to a resource, said server further comprising a microcomputer intermediate said interfaces, said microcomputer operable to receive a request for access to said resource from said device, said request including a certificate received from said device, said certificate including a device public encryption key associated with said device, said microcomputer operable to extract at least one identifier embedded into said certificate, said at least one extracted identifier including a digital signature generated by signing said device public encryption key with a gateway server public encryption key associated with said gateway server, said microcomputer further operable to determine if said at least one extracted identifier is valid, said microcomputer further operable to permit said device to access said resource if said at least one extracted identifier is determined to be valid; and to deny said device access to said resource and revoke said certificate if said at least one extracted identifier is determined to be invalid, wherein to determine whether said at least one extracted identifier is valid, said microcomputer is operable to attempt to verify said digital signature using a gateway server private encryption key.

63. The gateway server of claim 62, wherein said microcomputer is further operable to send said certificate to the device prior to receipt of said certificate from said device.

64. The gateway server of claim 62, wherein said microcomputer is further operable to send said certificate to the device prior to receipt of said certificate from said device and in response to receipt of a request for certificate from said device.

65. The gateway server of claim 63, wherein said digital signature is determined to be invalid if said digital signature cannot be verified using said gateway server private encryption key.

66. The gateway server of claim 63, wherein said microcomputer is further operable to determine whether said certificate has been revoked using a certificate revocation list and, if said certificate has been revoked, denying said device access to said resource.

67. The gateway server of claim 63, wherein said at least one extracted identifier comprises a plurality of extracted identifiers and wherein said microcomputer is operable to permit said device to access said resource if each of said plurality of extracted identifiers is valid.

68. The gateway server of claim 67, wherein said plurality of extracted identifiers comprises, in addition to said digital signature, an extracted gateway identifier associated with said gateway server.

69. The gateway server of claim 68, wherein said extracted gateway identifier is determined to be valid if said extracted gateway identifier is equivalent to a local store of a valid gateway.

70. The gateway server of claim 67, wherein said plurality of extracted identifiers comprises, in addition to said digital signature, an extracted device identifier.

71. The gateway server of claim 70, wherein said extracted device identifier is determined to be valid if said extracted device identifier is in a list of one or more valid device identifiers for at least one of the gateway server and the resource.

72. The gateway server of claim 70, wherein said extracted device identifier is determined to be valid if said extracted device identifier is equivalent to a second device identifier received from the device.

73. The gateway server of claim 63, wherein said resource is selected from the group consisting of at least one of the Internet and a local area network.

74. A non-transitory computer readable media containing a set of programming instructions for use in a gateway server, said instructions including a method of controlling access to a resource comprising:

receiving a digital certificate from a device, said certificate including a device public encryption key associated with said device;

extracting at least one identifier embedded into said certificate, said at least one extracted identifier including a digital signature generated by signing said device public encryption key with a gateway server public encryption key associated with said gateway server;

determining if said at least one extracted identifier is valid, wherein said determining comprises at least determining a validity of said digital signature using a gateway server private encryption key;

permitting said device to access said resource if said at least one extracted identifier is determined to be valid; and, denying said device access to said resource and revoking said certificate if said at least one extracted identifier is determined to be invalid.

* * * * *